(12) United States Patent
Solie et al.

(10) Patent No.: US 10,498,229 B2
(45) Date of Patent: Dec. 3, 2019

(54) METHOD AND CIRCUITRY TO SOFT START HIGH POWER CHARGE PUMPS

(71) Applicant: Intersil Americas LLC, Milpitas, CA (US)

(72) Inventors: Eric Magne Solie, Durham, NC (US); Mehul Shah, Cary, NC (US); Bin Li, Apex, NC (US); Paul K. Sferrazza, Cary, NC (US)

(73) Assignee: Intersil Americas LLC, Milpitas, CA (US)

( * ) Notice: Subject to any disclaimer, the term of this patent is extended or adjusted under 35 U.S.C. 154(b) by 0 days.

(21) Appl. No.: 15/610,318

(22) Filed: May 31, 2017

(65) Prior Publication Data

US 2017/0353105 A1    Dec. 7, 2017

Related U.S. Application Data

(60) Provisional application No. 62/480,286, filed on Mar. 31, 2017, provisional application No. 62/345,714, filed on Jun. 3, 2016.

(51) Int. Cl.
| | |
|---|---|
| *G05F 3/02* | (2006.01) |
| *H02M 3/07* | (2006.01) |
| *H02M 1/36* | (2007.01) |

(52) U.S. Cl.
CPC .............. *H02M 3/07* (2013.01); *H02M 1/36* (2013.01)

(58) Field of Classification Search
None
See application file for complete search history.

(56) References Cited

U.S. PATENT DOCUMENTS

| | | |
|---|---|---|
| 6,108,352 A | 8/2000 | Sferrazza et al. |
| 6,700,365 B2 | 3/2004 | Isham et al. |
| 6,873,191 B2 | 3/2005 | Dequina et al. |
| 6,930,520 B2 | 8/2005 | Solie |
| 6,940,262 B2 | 9/2005 | Dequina et al. |
| 6,958,596 B1 | 10/2005 | Sferrazza et al. |
| 6,998,829 B2 | 2/2006 | Solie |
| 7,023,187 B2 | 4/2006 | Shearon et al. |
| 7,031,175 B2 | 4/2006 | Dequina et al. |
| 7,088,151 B1 | 8/2006 | Dequina et al. |
| 7,102,335 B1 | 9/2006 | Solie |
| 7,145,317 B1 | 12/2006 | Shah |

(Continued)

*Primary Examiner* — Lincoln D Donovan
*Assistant Examiner* — Khareem E Almo
(74) *Attorney, Agent, or Firm* — Foley & Lardner LLP (57) ABSTRACT

A method to soft start a charge pump circuit according to embodiments includes enabling switching for a plurality of power transistors, selecting a first switching control signal from a plurality of switching control signals for the selected plurality of power transistors, slowly ramping up a plurality of bootstrap supply voltages associated with the selected plurality of power transistors, driving a gate-to-source voltage of each power transistor of the selected plurality of power transistors at a first predefined level, and determining if the plurality of bootstrap supply voltages are less than a second predefined level. If the plurality of bootstrap supply voltages are less than the second predefined level, the method further includes toggling and thereby selecting a second switching control signal from the plurality of switching control signals for a second selected plurality of power transistors.

20 Claims, 4 Drawing Sheets

(56) References Cited

U.S. PATENT DOCUMENTS

| | | |
|---|---|---|
| 7,199,558 B2 | 4/2007 | Solie et al. |
| 7,235,955 B2 | 6/2007 | Solie et al. |
| 7,420,791 B1 | 9/2008 | Dong et al. |
| 7,504,816 B2 | 3/2009 | Laur et al. |
| 7,518,430 B2 | 4/2009 | Dequina et al. |
| RE42,142 E | 2/2011 | Solie et al. |
| 7,880,443 B2 | 2/2011 | Solie et al. |
| 7,898,310 B2 | 3/2011 | Qui et al. |
| 7,948,213 B2 | 5/2011 | Solie et al. |
| 7,986,137 B2 | 7/2011 | Laur et al. |
| 7,990,116 B2 | 8/2011 | Solie et al. |
| RE43,513 E | 7/2012 | Solie et al. |
| RE43,538 E | 7/2012 | Solie et al. |
| 9,083,257 B2 * | 7/2015 | Tateno .................... H02M 1/38 |
| 9,231,583 B2 * | 1/2016 | Hoyerby ................. H02M 1/08 |
| 9,246,348 B2 | 1/2016 | Solie |
| 9,614,380 B2 | 4/2017 | Houston et al. |
| 9,685,869 B1 * | 6/2017 | Kinzer .................. H02J 7/0052 |
| 9,715,244 B2 | 7/2017 | Lim et al. |
| 9,819,257 B2 | 11/2017 | Solie et al. |
| 9,871,446 B2 | 1/2018 | Houston et al. |
| 10,014,853 B1 * | 7/2018 | Yang .................... H03K 17/063 |
| 2002/0075072 A1 * | 6/2002 | Ishida .................... H03F 3/2171 |
| | | 330/251 |
| 2006/0044051 A1 * | 3/2006 | Locatelli ................ G05F 1/618 |
| | | 327/536 |
| 2009/0160534 A1 * | 6/2009 | Jansen .................. H02M 7/538 |
| | | 327/536 |
| 2010/0002473 A1 * | 1/2010 | Williams .............. H02M 3/158 |
| | | 363/21.06 |
| 2014/0300413 A1 * | 10/2014 | Hoyerby ................. H02M 1/08 |
| | | 330/251 |
| 2017/0288511 A1 * | 10/2017 | Oljaca .................... H02K 11/33 |
| 2017/0350934 A1 * | 12/2017 | Sathik ................ G01R 31/2617 |
| 2017/0353105 A1 * | 12/2017 | Solie ....................... H02M 3/07 |

* cited by examiner

METHOD AND CIRCUITRY TO SOFT START HIGH POWER CHARGE PUMPS

CROSS-REFERENCE TO RELATED APPLICATIONS

The present application claims priority to U.S. Provisional Application No. 62/345,714 filed Jun. 3, 2016, and to U.S. Provisional Application No. 62/480,286, filed Mar. 31, 2017, the contents of all such applications being incorporated by reference herein in their entirety.

TECHNICAL FIELD

The present embodiments relate generally to power for electronic systems and more particularly to methods and apparatuses for soft starting high power charge pumps.

BACKGROUND

Charge pumps are switched-capacitor, inductor-less DC-DC voltage or power converters primarily utilized to provide operating voltages or power for portable, consumer electronic devices such as, for example, notebooks, laptops, personal computers, tablets, smart phones, digital cameras, and the like. High power charge pumps need to charge their capacitors from initial condition voltages to steady state voltages. Problems can occur in connection with this need.

SUMMARY

A method to soft start a charge pump circuit according to embodiments includes enabling switching for a plurality of power transistors, selecting a first switching control signal from a plurality of switching control signals for the selected plurality of power transistors, slowly ramping up a plurality of bootstrap supply voltages associated with the selected plurality of power transistors, driving a gate-to-source voltage of each power transistor of the selected plurality of power transistors at a first predefined level, and determining if the plurality of bootstrap supply voltages are less than a second predefined level. If the plurality of bootstrap supply voltages are less than the second predefined level, the method further includes toggling and thereby selecting a second switching control signal from the plurality of switching control signals for a second selected plurality of power transistors.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Charge pumps are switched-capacitor, inductor-less DC-DC voltage or power converters primarily utilized to provide operating voltages or power for portable, consumer electronic devices such as, for example, notebooks, laptops, personal computers, tablets, smart phones, digital cameras, and the like. Charge pumps are typically utilized in CMOS-based systems, because charge pump circuitry is area-efficient and thus cost-efficient, and can be readily implemented with existing integrated circuit technology.

Nevertheless, there are a number of significant problems with existing high power charge pumps (e.g., charge pumps with operating currents above 1 A). These problems arise during start-up when the high power charge pump circuits' capacitors are charged from their initial condition voltages to their steady state voltages. Specifically, during start-up, very high currents (e.g., >100 A) are generated in the circuits' switching transistors and capacitors prior to reaching the steady state. These very high currents are generated because there are no inductors utilized in the charge pump circuits that can function to limit these currents (di/dt) and/or store the corresponding energy created during start-up. Consequently, these start-up currents are limited merely by the inherent resistances of the switching transistors (Rdson) and capacitors (Resr) in the high power charge pump circuits involved. Therefore, during start-up, the output voltages of the high power charge pump circuits can quickly rise well above the desired steady state voltage levels, and the resulting over-voltages can damage the loads connected to the circuits' outputs.

An alternative start-up technique for existing high power charge pumps is to ramp up the duty cycle of the pulse-width modulation (PWM) switching voltage from 0% to a steady state percentage. For example, if the duty cycle of the switching voltage starts at 1% and is ramped up to 50%, the average current generated over a single period will be duty-cycled down to a low value, but the instantaneous current generated will still be very high. As such, this alternative start-up technique still produces very high currents albeit for shorter timeframes.

A second, alternative start-up technique is to charge up all of the circuit capacitors to their steady state voltages utilizing low drop-out (LDO) regulators prior to the switching events. However, the LDO regulators may not be able to deliver sufficient current in the high power charge pump circuits if their outputs are loaded. Also, the resulting high power dissipation localized in the LDO pass devices generates high temperatures in the controllers involved. For example, DC-DC converters utilizing such high power charge pumps are typically designed for a 10 A load. If this heavy a load is present while an LDO is attempting to charge up the charge pump circuit's output voltage, the LDO will be unable to charge up the output voltage (Vout) to one half of the input voltage (Vin/2). However, if a smaller load is present, and the LDO is able to charge up the output voltage to one half of the input voltage, the LDO will dissipate a substantial amount of power (e.g., 4V*10 A or 40 W) in a small area of the controller and thus damage that part. Nevertheless, notwithstanding the above-described problems with existing high power charge pumps, as described below, the present invention resolves these and other related problems with novel methods and circuitry to soft start high power charge pumps.

Figure 1:
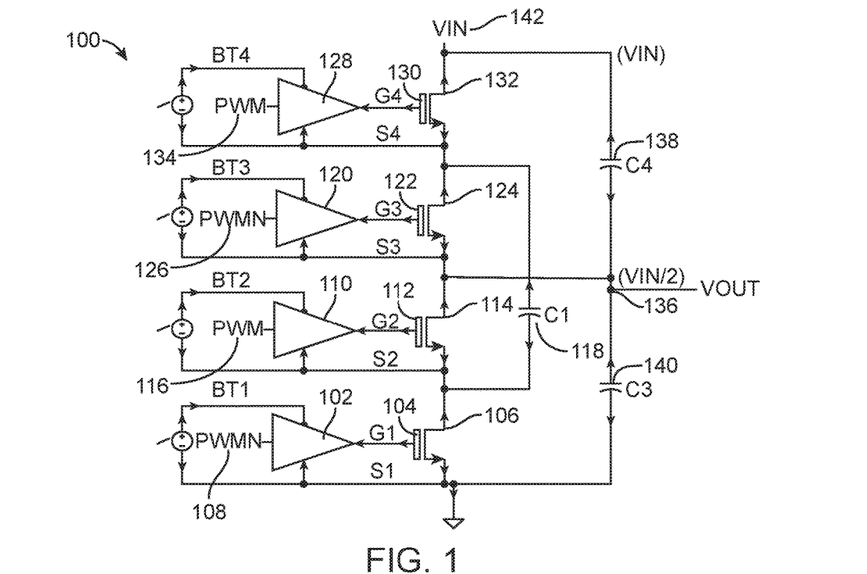
FIG. 1 is a schematic circuit diagram of a high power charge pump circuit that can be utilized to implement one exemplary embodiment of the present invention.

FIG. 1 is a schematic circuit diagram of a high power charge pump circuit 100, which can be utilized to implement one exemplary embodiment of the present invention. Referring to FIG. 1, high power charge pump circuit 100 includes a first gate drive circuit 102. The output terminal of the first gate drive circuit 102 is coupled to the gate terminal 104 of a first power field-effect transistor (FET) 106, which functions as a first electronic switch. The first gate drive circuit 102 thus functions to drive the gate (104) of the first power FET 106 in response to the first PWMN (PWM NOT) signal 108 received at the signal input terminal of the first gate drive circuit 102. For example, the PWM and PWMN signals can be complementary, fixed frequency square wave signals having a duty cycle of 50%, or variable frequency square wave signals having variable duty cycles. The high power charge pump circuit 100 also includes a second gate drive circuit 110. The output terminal of the second gate drive circuit 110 is coupled to the gate terminal 112 of a second power (FET) 114, which functions as a second electronic switch. The second gate drive circuit 110 thus functions to drive the gate (112) of the second power FET 114 in response to the first PWM signal 116 received at the signal input terminal of the second gate drive circuit 110. For this exemplary embodiment, the drain terminal of the first power FET 106 is coupled to the source terminal of the second power FET 114, and the source terminal of the first power FET 106 is coupled to a reference potential, e.g., ground. The drain terminal of the first power FET 106 and the source terminal of the second power FET 114 are both coupled to one side of the fly capacitor 118.

High power charge pump circuit 100 further includes a third gate drive circuit 120. The output terminal of the third gate drive circuit 120 is coupled to the gate terminal 122 of a third power FET 124, which functions as a third electronic switch. The third gate drive circuit 120 thus functions to drive the gate (122) of the third power FET 124 in response to the second PWMN signal 126 received at the signal input terminal of the third gate drive circuit 120. Notably, for this exemplary embodiment, the first PWMN signal 108 and the second PWMN signal 126 can be the same signal received, for example, from a PWM signal generator circuit in the system involved. However, in a second embodiment, the first PWMN signal 108 and the second PWMN signal 126 can be received, for example, from separate PWM signal generator circuits. In any event, high power charge pump circuit 100 further includes a fourth gate drive circuit 128. The output terminal of the fourth gate drive circuit 128 is coupled to the gate terminal 130 of a fourth power FET 132, which functions as a fourth electronic switch. The fourth gate drive circuit 128 thus functions to drive the gate (130) of the fourth power FET 132 in response to the second PWM signal 134 received at the signal input terminal of the fourth gate drive circuit 128. Notably, for this exemplary embodiment, the first PWM signal 116 and the second PWM signal 134 can be the same signal received, for example, from a PWM signal generator circuit in the system involved. However, in a second embodiment, the first PWM signal 116 and the second PWM signal 134 can be received, for example, from separate PWM signal generator circuits. In some embodiments, the first PWMN signal 108 and the second PWMN signal 126 can be inverted versions of the first PWM signal 116 or the second PWM signal 134. In any event, for this exemplary embodiment, the drain terminal of the third power FET 124 is coupled to the source terminal of the fourth power FET 132, and the source terminal of the third power FET 124 is coupled to the drain terminal of the second power FET 114 and an output terminal 136 of the high power charge pump circuit 100. The drain terminal of the third power FET 124 and the source terminal of the fourth power FET 132 are both coupled to the second side of the fly capacitor 118. The drain terminal of the fourth power FET 132 is coupled to one side of a first output capacitor 138 and an input terminal 142 of the high power charge pump circuit 100. The second side of the first output capacitor 138 is coupled to the output terminal 136 and one side of a second output capacitor 140, and the second side of the second output capacitor 140 is coupled to the reference potential, e.g., ground.

In operation, referring to the exemplary embodiment depicted in FIG. 1, the high power charge pump circuit 100 functions to ramp up the gate-to-source voltage (Vgs) of each of the power FETs 106, 114, 124, 132 from 0V to 5V over hundreds of switching cycles in response to the PWM and PWMN signals 108, 116 126, 134 driving the gates 104, 112, 122, 130 of the power FETs 106, 114, 124, 132 via the gate drive circuits 102, 110, 120, 128. For example, at start-up, the power FETs 106, 114, 124, 132 can be switched and turned on (conducting) at a slower rate to ramp up the Vgs by 0.1V increments (e.g., 0.5V, then 0.6V, then 0.7V, etc.). Notably, the ramp signals utilized can be linear or non-linear signals. In any event, once the charges on the capacitors 138, 140 and thus the voltage at the output terminal, Vout 136 reach the steady state level, the speed of the ramp signal can be accelerated (e.g., ramped up quickly from 1.5V to 5V).

One benefit of this "soft start" approach over existing approaches is that the current in the high power charge pump circuit 100 is limited substantially during start-up due to the low Vgs values of the power FETs 106, 114, 124, 132 utilized. Also, the voltage at the output terminal, Vout 136, is increased monotonically and thus is limited enough during start-up so that it cannot go higher than the requisite steady state voltage level. Furthermore, the power dissipated in the high power charge pump circuit 100 is beneficially spread over the four power FETs 106, 114, 124, 132 instead of merely being concentrated in one LDO pass device such as in existing high power charge pump circuits. Moreover, another significant benefit of high power charge pump circuit 100 is that its output can be loaded during start-up.

More precisely, in an exemplary soft start operation of the embodiment depicted in FIG. 1, before the switching cycle is enabled in the high power charge pump circuit 100, the outputs of all of the gate drive circuits 102, 110, 120, 128 will be at 0V, the voltage at the output terminal Vout 136 will be at 0V, and the voltage at the input terminal Vin 142 can be at 8V. When the switching cycle is enabled, the PWM and PWMN control signals 108, 116, 126, 134 begin switching at 800 khz, and in response, the floating bootstrap supplies, BT1 to S1, BT2 to S2, BT3 to S3, and BT4 to S4, and thus the gate drive circuits 102, 110, 120, 128 begin to slowly ramp up (e.g., increasing at 1V/ms rate). For this example operation, when the bootstrap supplies BT1 to S1, BT2 to S2, BT3 to S3, BT4 to S4 and thus the gate drive circuits 102, 110, 120, 128 have ramped up to 0.5V, and the PWM control signal is equal to 1, then the power FETs that should be on or conducting (e.g., 114, 132) will be driven with 0.5V for their Vgs. As the bootstrap supply voltages rise higher, the Vgs applied to each of the "ON FETs" will rise as well. When the Vgs reaches the voltage threshold, Vth, of the power FETs involved, then those power FETs will start conducting current but with a very high resistance (e.g., >1 kΩ). Consequently, for example, if the fly capacitor 118 is charged to the value of the input voltage, which is Vin or 8V before start-up, when the square wave, switching signals at the gates 104 and 122 turn on their corresponding power FETs 106, 124, the current delivered from the fly capacitor 118 to Cout 140 (e.g., capacitance at Vout) will be substantially limited by the high resistance of the power FETs 106, 124 during the soft start process. Similarly, when the square wave, switching signals at the gates 112 and 130 turn on the corresponding power FETs 114, 132, the current delivered to the fly capacitor 118 from Cout 138 (e.g., capacitance at Vout) will be substantially limited by the high resistance of the power FETs 114, 132 during the soft start process.

Figure 2:
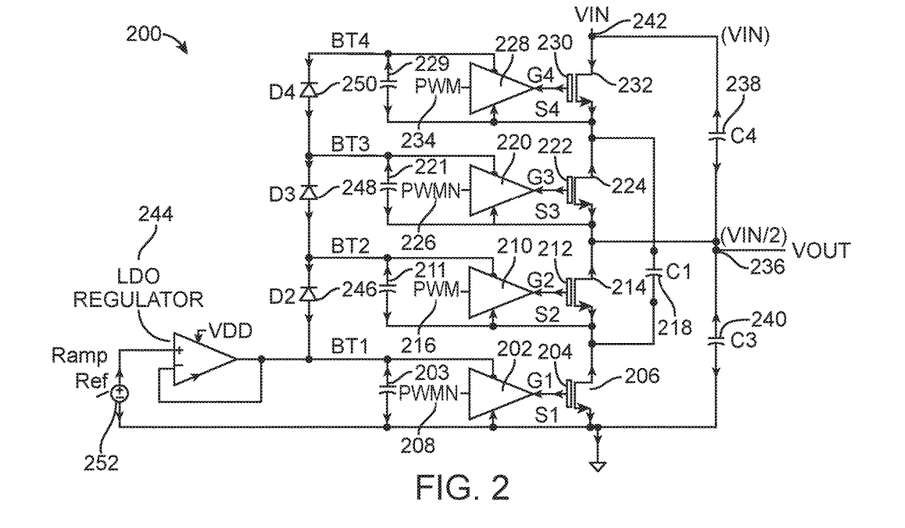
FIG. 2 is a schematic circuit diagram of a high power charge pump circuit that can be utilized to implement a second exemplary embodiment of the present invention.

FIG. 2 is a schematic circuit diagram of a high power charge pump circuit 200, which can be utilized to implement a second exemplary embodiment of the present invention. Referring to FIG. 2, high power charge pump circuit 200 includes a first gate drive circuit 202. The output terminal of the first gate drive circuit 202 is coupled to the gate terminal 204 of a first power FET 206, which functions as a first electronic switch. The first gate drive circuit 202 thus functions to drive the gate (204) of the first power FET 206 in response to the first PWMN signal 208 received at the signal input terminal of the first gate drive circuit 202. High power charge pump circuit 200 also includes a second gate drive circuit 210. The output terminal of the second gate drive circuit 210 is coupled to the gate terminal 212 of a second power FET 214. The second gate drive circuit 210 thus functions to drive the gate (212) of the second power FET 214 in response to the first PWM signal 216 received at the signal input terminal of the second gate drive circuit 210. For this exemplary embodiment, the drain terminal of the first power FET 206 is coupled to the source terminal of the second power FET 214, and the source terminal of the first power FET 206 is coupled to a reference potential, e.g., ground. The drain terminal of the first power FET 206 and the source terminal of the second power FET 214 are both coupled to one side of the fly capacitor 218.

High power charge pump circuit 200 further includes a third gate drive circuit 220. The output terminal of the third gate drive circuit 220 is coupled to the gate terminal 222 of a third power FET 224, which functions as a third electronic switch. The third gate drive circuit 220 thus functions to drive the gate (222) of the third power FET 224 in response to the second PWMN signal 226 (e.g., the same signal as the first PWMN signal 208) received at the signal input terminal of the third gate drive circuit 220. Moreover, high power charge pump circuit 200 includes a fourth gate drive circuit 228. The output terminal of the fourth gate drive circuit 228 is coupled to the gate terminal 230 of a fourth power FET 232, which functions as a fourth electronic switch. The fourth gate drive circuit 228 thus functions to drive the gate (230) of the fourth power FET 232 in response to the second PWM signal 234 (e.g., the same signal as the first PWM signal 216) received at the signal input terminal of the fourth gate drive circuit 228. For this exemplary embodiment, the drain terminal of the third power FET 224 is coupled to the source terminal of the fourth power FET 232, and the source terminal of the third power FET 224 is coupled to the drain terminal of the second power FET 214 and an output terminal 236 of the high power charge pump circuit 200. The drain terminal of the third power FET 224 and the source terminal of the fourth power FET 232 are both coupled to the second side of the fly capacitor 218. The drain terminal of the fourth power FET 232 is coupled to one side of a first output capacitor 238 and an input terminal 242 of the high power charge pump circuit 200. The second side of the first output capacitor 238 is coupled to the output terminal 236 and one side of a second output capacitor 240, and the second side of the second output capacitor 240 is coupled to the reference potential, e.g., ground.

For this exemplary embodiment, the high power charge pump circuit 200 further includes an LDO regulator 244, which is coupled at its output to a terminal of the bootstrap diode 246 and a terminal of the bootstrap capacitor 203. The second terminal of the bootstrap capacitor 203 is coupled to the reference potential, e.g., ground. The non-inverting input of the LDO regulator 244 is coupled to one terminal of a ramp reference generator 252, and the second terminal of the ramp reference generator 252 is coupled to the reference potential, e.g., ground. For this embodiment, the LDO regulator 244 is configured to ramp up the first gate drive circuit 202 and its associated boot capacitor 203. Also, bootstrap diodes 246, 248, 250 are series coupled to the output terminal of the LDO regulator 244. As such, each one of the bootstrap diodes 246, 248, 250 is utilized to pass the charge voltage on the boot capacitor 203 up the diode ladder 246, 248, 250 and thus charge and ramp up each of the respective boot capacitors 211, 221, 229.

Specifically, in an exemplary soft start operation for this exemplary embodiment, a ramp reference voltage "Ramp Ref," which is generated by the ramp reference generator 252, is applied to the non-inverting input of the LDO regulator 244, and the "Ramp Ref" voltage is ramped up from 0V to 5V. In response, the LDO regulator 244 drives the first gate drive voltage (BT1 to S1) to follow the ramp voltage. When the first gate drive voltage (BT1 to S1) is high enough to turn on the first power FET 206, then the boot capacitor 211 will charge up to the first gate drive voltage (BT1 to S1) through the current path from the boot capacitor 203 to BT1, through diode 246, boot capacitor 211 through BT2, and power FET 206. Similarly, boot capacitor 211 (C_BT2) will charge boot capacitor 221 (C_BT3), and boot capacitor 221 (C_BT3) will charge boot capacitor 229 (C_BT4). In other words, the bootstrap diodes 246, 248, 250 are configured to pass the charging voltage up the diode ladder so that the charges on the boot capacitors 211, 221, 229 for each bootstrap power supply BT2 to S2, BT3 to S3 and BT4 to S4 are also ramped up by the ramp reference voltage, Ramp Ref, in a soft start process.

Figure 3:
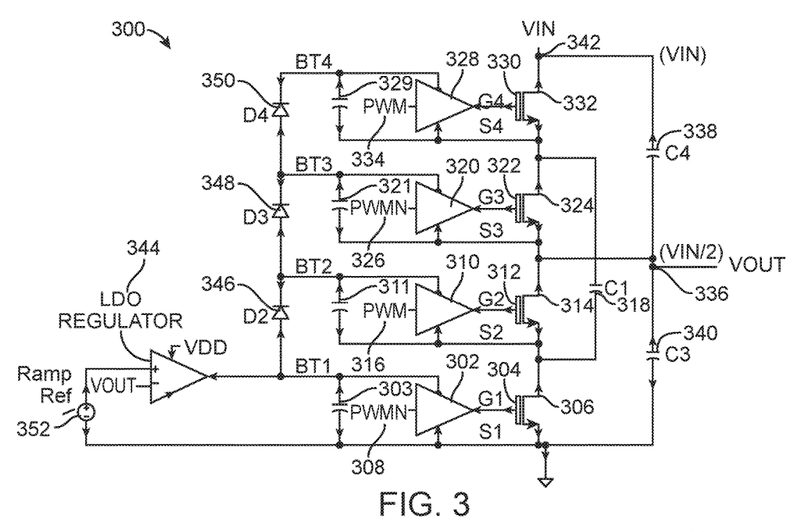
FIG. 3 is a schematic circuit diagram of a high power charge pump circuit that can be utilized to implement a third exemplary embodiment of the present invention.

FIG. 3 is a schematic circuit diagram of a high power charge pump circuit 300, which can be utilized to implement a third exemplary embodiment of the present invention. Referring to FIG. 3, high power charge pump circuit 300 includes a first gate drive circuit 302. The output terminal of the first gate drive circuit 302 is coupled to the gate terminal 304 of a first power FET 306, which functions as a first electronic switch. The first gate drive circuit 302 thus functions to drive the gate (304) of the first power FET 306 in response to the first PWMN signal 308 received at the signal input terminal of the first gate drive circuit 302. High power charge pump circuit 300 also includes a second gate drive circuit 310. The output terminal of the second gate drive circuit 310 is coupled to the gate terminal 312 of a second power FET 314. The second gate drive circuit 310 thus functions to drive the gate (312) of the second power FET 314 in response to the first PWM signal 316 received at the signal input terminal of the second gate drive circuit 310. For this exemplary embodiment, the drain terminal of the first power FET 306 is coupled to the source terminal of the second power FET 314, and the source terminal of the first power FET 306 is coupled to a reference potential, e.g., ground. The drain terminal of the first power FET 306 and the source terminal of the second power FET 314 are both coupled to one side of the fly capacitor 318.

High power charge pump circuit 300 further includes a third gate drive circuit 320. The output terminal of the third gate drive circuit 320 is coupled to the gate terminal 322 of a third power FET 324, which functions as a third electronic switch. The third gate drive circuit 320 thus functions to drive the gate (322) of the third power FET 324 in response to the second PWMN signal 326 (e.g., the same signal as the first PWMN signal 308) received at the signal input terminal of the third gate drive circuit 320. Moreover, high power charge pump circuit 300 includes a fourth gate drive circuit 328. The output terminal of the fourth gate drive circuit 328 is coupled to the gate terminal 330 of a fourth power FET 332, which functions as a fourth electronic switch. The fourth gate drive circuit 328 thus functions to drive the gate (330) of the fourth power FET 332 in response to the second PWM signal 334 (e.g., the same signal as the first PWM signal 316) received at the signal input terminal of the fourth gate drive circuit 328. For this exemplary embodiment, the drain terminal of the third power FET 324 is coupled to the source terminal of the fourth power FET 332, and the source terminal of the third power FET 324 is coupled to the drain terminal of the second power FET 314 and an output terminal 336 of the high power charge pump circuit 300. The drain terminal of the third power FET 324 and the source terminal of the fourth power FET 332 are both coupled to the second side of the fly capacitor 318. The drain terminal of the fourth power FET 332 is coupled to one side of a first output capacitor 338 and an input terminal 342 of the high power charge pump circuit 300. The second side of the first output capacitor 338 is coupled to the output terminal 336 and one side of a second output capacitor 340, and the second side of the second output capacitor 340 is coupled to the reference potential, e.g., ground.

For this exemplary embodiment, the high power charge pump circuit 300 further includes a LDO regulator 344, which is configured to ramp up the first gate drive circuit 302 and its associated boot capacitor 303. Notably, however, in this embodiment, the LDO regulator 344 is configured with the voltage, Vout, at the output terminal 336 of the high power charge pump circuit 300, coupled to the inverting input terminal of the LDO regulator 344. Consequently, the voltage, Vout, at the output terminal 336 of the high power charge pump circuit 300 follows the reference ramp signal, Ramp Ref, from the ramp reference generator 352. Specifically, the LDO regulator 344 drives the charge across the capacitor 303 so that the output voltage, Vout, follows or tracks the reference ramp signal, Ramp Ref. Notably, this soft start process can significantly shorten the soft start time required (e.g., as compared to the embodiment depicted in FIG. 2).

Specifically, in an exemplary operation, the output voltage, Vout, at the output terminal 336 starts to catch up to the ramp voltage (e.g., at 1V). When the output voltage, Vout, at the output terminal 336 reaches 4V, the ramp voltage will continue to rise to 5V to drive the BT1 to S1 supply voltage to 5V and thereby speed up the time needed to fully enhance the switching FETs 306, 314, 324, 332. In this embodiment, the soft start time duration is shortened substantially by quickly ramping up to the 1.5V threshold for the switching FETs 306, 314, 324, 332, and then continuing to ramp up to the steady state voltage level and thereby enhancing the switching process.

Figure 4:
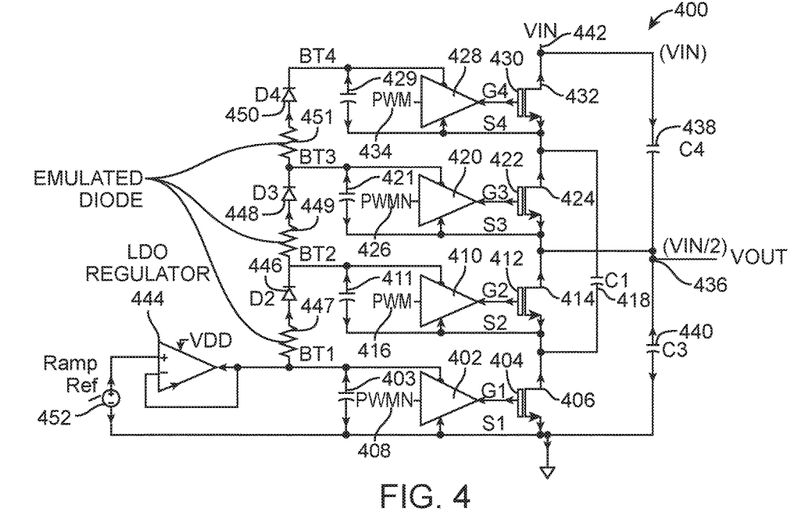
FIG. 4 is a schematic circuit diagram of a high power charge pump circuit that can be utilized to implement a fourth exemplary embodiment of the present invention.

FIG. 4 is a schematic circuit diagram of a high power charge pump circuit 400, which can be utilized to implement a fourth exemplary embodiment of the present invention. Referring to FIG. 4, the high power charge pump circuit 400 includes a LDO regulator 444 that is utilized to ramp up the first boot supply voltage (BT1 to S1) and its associated boot capacitor 403, and bootstrap diodes 446, 448, 450 that are configured to pass the charge voltage up the diode ladder and thus ramp up their respective boot capacitors 411, 421, 429 similarly to the process described above with respect to the embodiment depicted in FIG. 2. Notably, the embodiment depicted in FIG. 4 is configured substantially the same as the embodiment depicted in FIG. 2. However, for this exemplary embodiment depicted in FIG. 4, a plurality of emulated diodes 447, 449 and 451 (e.g., PMOS transistor devices configured to function as bootstrap diodes 446, 448, 450, respectively) are also shown connected to their respective bootstrap diodes 446, 448, 450. As such, in an exemplary operation of the high power charge pump circuit 400 shown, at startup, only fractional portions of the PMOS transistors 447, 449, 451 being utilized to emulate the bootstrap diodes 446, 448, 450 are turned on, in order to control the slew rate and the peak current controlling the ramp rate for the three bootstrap capacitors 411, 421, 429 so that they are not charged up in lockstep. In other words, at and during startup, the "partial" bootstrap diodes 446, 448, 450 (e.g., represented as emulated diodes 447, 449, 451) are connected to the circuitry and thus utilized to provide a soft start, and subsequent to startup, the entire portions or the "full" bootstrap diodes (e.g., represented as diodes 446, 448, 450) are then utilized in the high power charge pump circuit 400.

Figure 5:
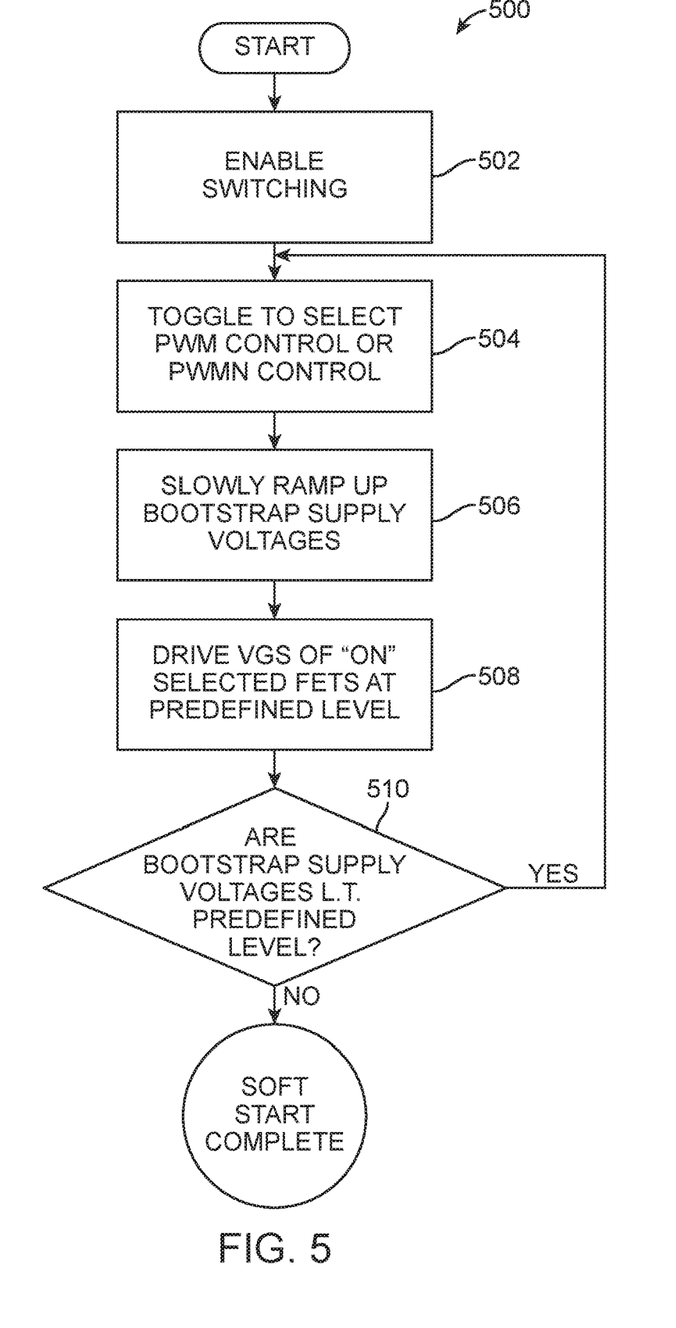
FIG. 5 depicts a flow diagram of an exemplary method that can be utilized to implement a high power charge pump circuit, in accordance with one exemplary embodiment of the present invention.

FIG. 5 depicts a flow diagram of an exemplary method 500, which can be utilized to implement a high power charge pump circuit, in accordance with one exemplary embodiment of the present invention. Referring to the flow diagram depicted in FIG. 5 and the exemplary high power charge pump circuit 100 depicted in FIG. 1, the exemplary method 500 begins by enabling switching for the power FETs 106, 114, 124, 132 (502). Next, the method toggles to select either PWM control for the (e.g., "high") power FETs 114, 132 or PWMN control for the (e.g., "low") power FETs 106, 124 (504). Assume, for this embodiment, that the PWM control signals are selected (and switching at 800 khz). Next, the bootstrap supplies BT1 to S1, BT2 to S2, BT3 to S3, and BT4 to S4 begin to slowly ramp up (e.g., increase at 1V/ms) the gate drive voltages for the power FETs 106, 114, 124, 132 (506). At a predefined bootstrap supply voltage level (e.g., 0.5V), the gate drive circuits for the selected power FETs are utilized to drive the Vgs of the "on" selected power FETs (e.g., "high" or "low" power FETs) at a predefined level (e.g., 0.5 Vgs) (508). The method then determines if the bootstrap supply voltages BT1 to S1, BT2 to S2, BT3 to S3 and BT4 to S4 are less than a predefined level (e.g., level less than 5V) (510). If (at 510) the bootstrap supply voltages are less than the predefined level, the flow returns to "toggle" (504) and the other control signal is selected (e.g., PWMN in this example). However, if (at 510) the bootstrap supply voltages are not less than the predefined level, the soft start method is completed.

Figure 6:
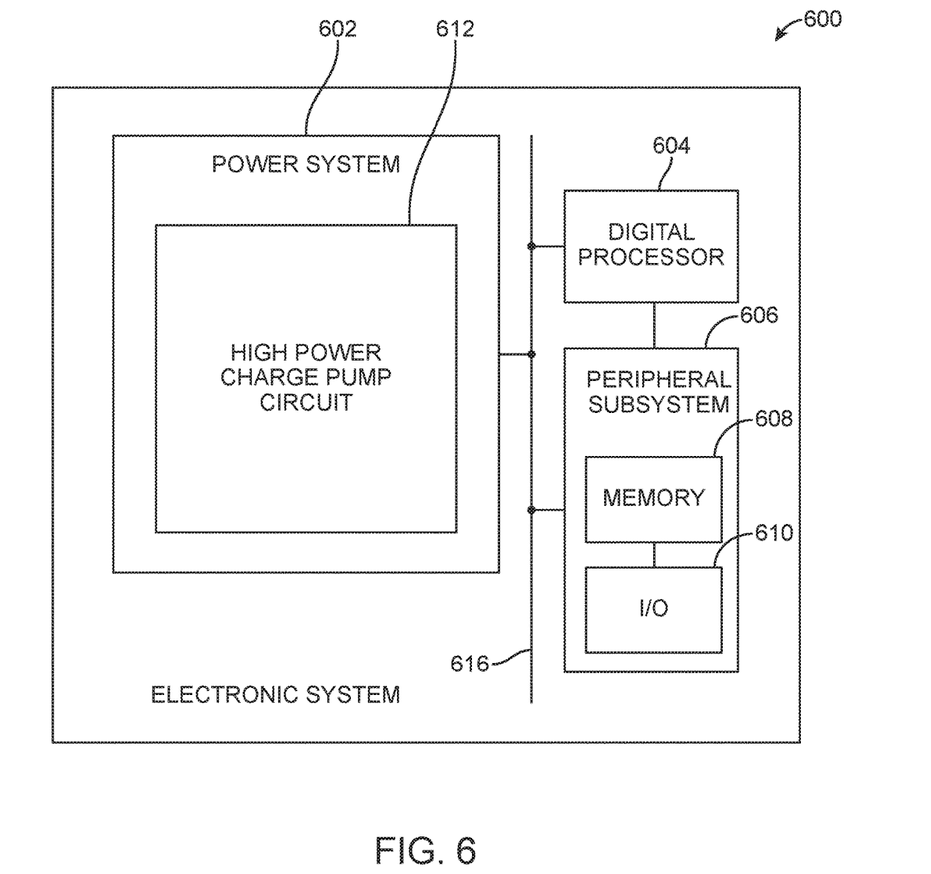
FIG. 6 is a schematic block diagram of a portable or mobile electronic system that can be utilized to implement a high power charge pump circuit, in accordance with one exemplary embodiment of the present invention.

FIG. 6 is a schematic block diagram of a portable or mobile electronic system 600, which can be utilized to implement a high power charge pump circuit, in accordance with one exemplary embodiment of the present invention. For example, in some embodiments, the high power charge pump circuits described herein can be considered as one or more power delivery systems. As such, in the exemplary embodiment shown, the electronic system 600 includes a power system 602, a digital processor unit 604, and a peripheral subsystem 606. For example, the digital processor unit 604 can be a microprocessor or microcontroller and the like. The peripheral subsystem 606 includes a memory unit 608 for storing the data processed by the digital processor unit 604, and an input/output (I/O) unit 610 for transmitting and receiving the data to/from the memory unit 608 and the digital processor unit 604. In the exemplary embodiment depicted in FIG. 6, the power system 602 includes a high power charge pump circuit 612 that can deliver a voltage to power the system 600. The power system 602 provides a regulated (or unregulated) voltage via line 616 to power the electronic components in the digital processor unit 604 and peripheral subsystem 606. In the exemplary embodiment shown, the high power charge pump circuit 612 can be implemented, for example, utilizing one of the high power charge pump circuits depicted in FIGS. 1 through 4. In some embodiments, the components of the electronic system 600 can be implemented in one or more integrated circuits, wafers, chips or dies.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that the present application be limited only by the claims and the equivalents thereof. Notably, the exemplary techniques described above are for a 2 to 1 divider ratio but can be expanded to include other divider ratios, such as, for example, 3 to 1 or greater. The exemplary techniques described above can also be utilized with discrete or integrated power FETs.

What is claimed is:

1. A method to soft start a charge pump circuit, comprising:
    enabling switching for a plurality of power transistors;
    selecting a first switching control signal from a plurality of switching control signals for a first selected plurality of power transistors;
    slowly ramping up a plurality of bootstrap supply voltages associated with the first selected plurality of power transistors at a first ramp up rate;
    driving a gate-to-source voltage of each power transistor of the first selected plurality of power transistors at a first predefined level;
    determining if the plurality of bootstrap supply voltages are less than a second predefined level;
    if the plurality of bootstrap supply voltages are less than the second predefined level, toggling and thereby selecting a second switching control signal from the plurality of switching control signals for a second selected plurality of power transistors; and
    if the plurality of bootstrap supply voltages are greater than or equal to the second predefined level, discontinuing slowly ramping up the plurality of bootstrap supply voltages at the first ramp up rate and begin ramping up the plurality of bootstrap supply voltages at a second ramp up rate that is faster than the first ramp up rate.

2. The method of claim 1, wherein the selecting the first switching control signal comprises selecting a PWM control signal.

3. The method of claim 1, wherein the selecting the second switching control signal comprises selecting a PWMN control signal.

4. The method of claim 1, wherein the selecting the first switching control signal comprises selecting a plurality of square wave switching signals for the first selected plurality of power transistors.

5. The method of claim 1, wherein the selecting the second first switching control signal comprises selecting a plurality of inverted square wave switching signals for the second selected plurality of power transistors.

6. The method of claim 1, wherein the slowly ramping up the plurality of bootstrap supply voltages further comprises a diode and an associated capacitor generating at least one bootstrap supply voltage of the plurality of bootstrap supply voltages.

7. The method of claim 1, wherein the slowly ramping up the plurality of bootstrap supply voltages further comprises an emulated diode and an associated capacitor generating at least one bootstrap supply voltage of the plurality of bootstrap supply voltages.

8. The method of claim 1, wherein the ramping up the plurality of bootstrap supply voltages comprises ramping up the plurality of bootstrap supply voltages responsive to a ramp reference generator signal.

9. A charge pump circuit, comprising:
    a plurality of bootstrap power supplies;
    a plurality of gate drive circuits, wherein each gate drive circuit of the plurality of gate drive circuits is coupled to an associated bootstrap power supply of the plurality of bootstrap supplies;
    a plurality of power transistors, wherein each power transistor of the plurality of power transistors is coupled to an associated gate drive circuit of the plurality of gate drive circuits and to an output of the charge pump circuit, and wherein each bootstrap power supply of the plurality of bootstrap power supplies is configured to control a ramping up rate of a gate drive signal applied by an associated gate drive circuit of the plurality of gate drive circuits to a gate of an associated power transistor of the plurality of power transistors, wherein each bootstrap power supply of the plurality of bootstrap power supplies ramps up the gate drive signal at a first slow ramp up rate during a soft start process, and then ramps up the gate drive signal at a second faster ramp up rate after the soft start process is complete; and a plurality of capacitors coupled to the plurality of power transistors and the output of the charge pump circuit.

10. The charge pump circuit of claim 9, wherein the charge pump circuit comprises a high power charge pump circuit.

11. The charge pump circuit of claim 9, further comprising a low dropout (LDO) voltage regulator coupled to the plurality of bootstrap power supplies.

12. The charge pump circuit of claim 9, wherein at least one bootstrap power supply comprises a capacitor and a diode.

13. The charge pump circuit of claim 9, wherein at least one bootstrap power supply comprises an emulated diode and a capacitor.

14. A high power charge pump circuit, comprising:
an input terminal;
an output terminal;
at least one reference voltage generator;
a plurality of gate drive circuits coupled to the at least one reference voltage generator and at least one pulse-width modulation (PWM) signal generator;
a plurality of transistors coupled to the plurality of gate drive circuits, the input terminal, the output terminal and a fly capacitor; and
a first capacitor connected to the input terminal and the output terminal, and a second capacitor connected to the first capacitor, the output terminal and a reference potential.

15. The high power charge pump circuit of claim 14, further comprising:
a LDO voltage regulator coupled to the at least one reference voltage generator, wherein the at least one reference voltage generator is configured to generate a ramp reference signal.

16. The high power charge pump circuit of claim 14, wherein the at least one reference voltage generator comprises a bootstrap supply.

17. The high power charge pump circuit of claim 16, wherein the at least one reference voltage generator further comprises a diode and an associated capacitor, or an emulated diode and an associated capacitor.

18. An electronic system, comprising:
a digital processor;
a peripheral subsystem coupled to the digital processor; and
a power system coupled to the digital processor and circuit components of the peripheral subsystem and configured to generate an output voltage to power the digital processor and the circuit components of the peripheral subsystem, wherein the power system includes a high power charge pump circuit, comprising:
a plurality of bootstrap power supplies;
a plurality of gate drive circuits, wherein each gate drive circuit of the plurality of gate drive circuits is coupled to an associated bootstrap power supply of the plurality of bootstrap supplies;
a plurality of power transistors, wherein each power transistor of the plurality of power transistors is coupled to an associated gate drive circuit of the plurality of gate drive circuits and to an output of the charge pump circuit, and wherein each bootstrap power supply of the plurality of bootstrap power supplies is configured to control a ramping up rate of a gate drive signal applied by an associated gate drive circuit of the plurality of gate drive circuits to a gate of an associated power transistor of the plurality of power transistors and a plurality of capacitors coupled to the plurality of power transistors and the output of the charge pump circuit, wherein each bootstrap power supply of the plurality of bootstrap power supplies ramps up the gate drive signal at a first slow ramp up rate during a soft start process, and then ramps up the gate drive signal at a second faster ramp up rate after the soft start process is complete.

19. The electronic system of claim 18, wherein the high power charge pump circuit is formed on an integrated circuit, wafer, chip or die.

20. The electronic system of claim 18, wherein the power system and the high power charge pump circuit are formed on an integrated circuit, wafer, chip or die.

* * * * *